United States Patent
Das et al.

(10) Patent No.: US 6,306,195 B1
(45) Date of Patent: Oct. 23, 2001

(54) PROCESS FOR THE PREPARATION OF HIGH GRADE SYNTHETIC RUTILE AND PIG IRON

(75) Inventors: Pawvathu Narayanan Nair Mohan Das; Karval Harikrishna Bhat; Melay Eriyat Kochu Janaki; Sreedharan Sasibhushanan, all of Thiruvananthapuram; Parthasarathi Mukherjee, Bhubaneshwar; Bishnu Charan Rabindha Mohanty, Bhubaneshwar; Hem Shanker Ray, Bhubaneshwar, all of (IN)

(73) Assignee: Council of Scientific and Industiral Research, New Delhi (IN)

( * ) Notice: Subject to any disclaimer, the term of this patent is extended or adjusted under 35 U.S.C. 154(b) by 0 days.

(21) Appl. No.: 09/535,511

(22) Filed: Mar. 24, 2000

(51) Int. Cl.[7] .............................. C21B 3/06; C21B 11/08
(52) U.S. Cl. ........................ 75/10.22; 75/435; 75/958; 423/82; 423/85; 423/658.5
(58) Field of Search ................................. 75/10.22, 435, 75/958; 423/82, 85, 658.5

(56) References Cited

U.S. PATENT DOCUMENTS 3,765,868 * 10/1973 Moklebust ..................... 75/10.61
5,244,488 * 9/1993 Sato et al. ...................... 75/10.19

FOREIGN PATENT DOCUMENTS

583126-A1 * 2/1994 (EP).

* cited by examiner

*Primary Examiner*—Roy King
*Assistant Examiner*—Tima McGuthry-Banks
(74) *Attorney, Agent, or Firm*—Darby & Darby

(57) ABSTRACT

The present invention relates to an improved process for the preparation of high grade synthetic rutile from ilmenite with pig iron as a by-product. The process comprises subjecting ilmenite to reduction with coal, cooling and removing unreacted coal to obtain a product having 80–95% metallization, smelting the metallized ilmenite mixed with less than 10% carbon (w/w) in a transferred arc plasma using arc current, under flow of inert gas for a fixed time. The metal is then separated as pig iron and $TiO_2$ as slag, the slag ground followed by oxidation at high temperature in the presence of an oxidizing gas, the oxidized product being leached with dilute HCl followed by filtration, washing and drying to obtain synthetic rutile.

7 Claims, No Drawings

PROCESS FOR THE PREPARATION OF HIGH GRADE SYNTHETIC RUTILE AND PIG IRON

FIELD OF THE INVENTION

The present invention relates to a process for the preparation of high grade synthetic rutile and pig iron from ilmenites.

More particularly, this invention relates to an improved process for the production of high grade synthetic rutile and pig iron from pre-reduced ilmenite in a more environmentally friendly route and recovering all the iron values from ilmenite in the form of value added pig iron. This process can be widely used in industries such as $TiO_2$ pigment manufacturing, titanium metal production and ilmenite processing industries.

BACKGROUND OF THE INVENTION

Synthetic rutile containing more than 90% $TiO_2$ and titania rich slag containing about 80–85% $TiO_2$ are the major feed stocks for the production of $TiO_2$ pigment or $TiCl_4$ from which titanium metal is produced by reduction. $TiO_2$ has got a number of very important applications as pigments as well as in the paper, plastics, rubber and textile industries apart from its use as welding electrode flux material.

The demand for $TiO_2$ pigment is increasing rapidly and as natural rutile supply is limited, there is pressing demand for utilising the abundantly available ilmenite for producing synthetic rutile, which can subsequently be used for further processing. Production of alternate feed stocks namely, synthetic rutile or $TiO_2$ slag from ilmenite has gained importance in this context, which may bridge the demand supply gap of $TiO_2$ pigment.

A number of methods have been reported for the production of synthetic rutile from ilmenite out of which, only a very few are significant for industrial production. Many reviews on the beneficiation of ilmenite for synthetic rutile have been published. The important ones are by S. K. Jain et al (Ind. J. Technol., 15(9), 1977, 398–402), P. K. Jena et al (Ban. Met., 5, 1973, 107–117), J. A. Kahn (J. Metals, July 1984, 33–38), Moldran Iuliu et al (Chem. Abstr., 84 (1976), 78476 p), S. Yamada, (Ind. Miner., (London), 100 (1976), 33–40).

The various methods available for processing ilmenite for the preparation of synthetic rutile can be classified under different heads based on the physical and chemical principles employed for the processing.

In the fusion method, ilmenite is fused with various alkali metal compounds such as $Na_2CO_3$, $NaHSO_4$, $Na_2SO_4$, and ZnS for converting it to a leachable product. After fusion ilmenite is leached with acids such that titanium and iron go into solution from where they are recovered (E. M. Khairy, M. K. Hussain and K. A. Baraway (NML Tech. J, 10 (4), 1968; K. V. V. Nair, Bull. Central Res. Inst. Uni. Travancore, 11 (1952), 106; A. K. Sharova and A. A. Fotiyev, Izev. Sibirskogo Otd. Akad. Nauk. SSSR, 4, (1959) 52; Y. Tokimoto and H. Hattori, J. Chem. Soc. Jpn. Ind. Chem. Soc. 58 (1955) 654; S. Prasad and J. B. P. Tripathi, Ind. J. Appl. Chem., 21 (1958) 162; A. S. Gaskin and A. E. Ringwood, Australian Patent 222517 (1959); G. Jabsen, Norwegian Patent 21693 (1910), Chem. Abstr. 6, (1912), 2153; L. E. Barton, U.S. Pat. No. 1,201,541 (1917), Chem. Abstr., 11 (1917), 279; Fr. Patent 483780 (1917), Chem. Abstr. 12 (1918) 1000; Br. Patent 106585 (1916), Chem. Abstr. 11 (1917), 2575; Norwegian Patent 29194 (1918), Chem. Abstr. 14 (1920), 1418; Belgian Patent 447709 (1942), Chem. Abstr. 41 (1947), 7064); H. H. Hoekje and R. A. Kearley, (German Patent 1058463 (1959), Chem. Abstr. 55, (1961), 5892); T. Shino, T. Tanaka, Y.Tanaka and Y. Takimoto (Jap. Patent 8771 (1950)); A. K. Sharova and A. A. Fotipev, (Chem. Abstr. 53 (1959), 26717.

The disadvantages of the process are that it generates large quantities of effluents and has got corrosion problems. Due to the high cost of alkali and other fusion materials the process is also uneconomical.

In the direct acid leaching route, ilmenite is leached with mineral acids such as hydrochloric acid and sulphuric acid for the production of synthetic rutile. On leaching ilmenite with sulphuric acid, both $TiO_2$ and iron oxide go into the solution while in the case of HCl leaching, only iron is selectively removed from ilmenite (E. N. Kramer, U.S. Pat. No. 2,437,164 (1948), British Titan products Co. Ltd., Br. Patent 1085359 (1967); Ching Lung Lo and T. S. Mackey, Wah Chang Corp. U.S. Pat. No. 3,193,376 (1965); G. S. Davar, Ind. Patent 124558 (1969); Kenzo Ishihara, Outline of Ishihara Shngyo Kaisha Ltd. (1970); Columbia Southern Chemical Corp. Br. Patent 795164 (1958); N. N. Murach and L. G. Povedskaya, USSR Patent 116155 (1958); N. A. Aawal, M. Rehman, S. A. Tarafder and A. M. S. Huq, Chem. Abstr. 85, (1976), 146321 g).

In another industrially important process, ilmenite is subjected to partial reduction for converting the iron oxide to ferrous state, which is subsequently subjected to acid leaching for the production of synthetic rutile. There are a number of processes falling under this category which include: Murso (R. I. Jaffe and H. M. Burte, Titanium Sci. and Technol. Vol. 1, (Eds) R. I. Jaffe and H. M. Burte, Plenum Press, New York, London (1973); Burastero (J. Burastero, Chem. Abstr. 89, (1978), 26787z); Kurata (T. Kurata, Emi Satoshi, O. Kunihiko, T. Tstutomu and S. Isamu, Jpn. Kokai, 7693714 (1976). In certain cases a pre-oxidation of ilmenite prior to reduction was found to be helpful for reduction. M. G. Mu Ismail, J. Amarasekara and J. S. N. Kumarasinghe, Intl. J. Miner. Process. 10 (2), (1983), 161–164) report a similar process for the production of synthetic rutile from Sri Lankan ilmenites. Kerr Mc. Corp. has suggested a method where ilmenite is first subjected to oxidation followed by reduction and acid leaching (Rado Theodore A. C. Kerr. Mc. Corp. U.S. Pat. No. 4,199,552 (1980). In another process ilmenite was completely reduced to convert iron oxide to metallic iron, which was then removed by aqueous aeration rusting in presence of a catalyst (B. F. Bracanin, R. J. Clements and V. John, Proc. Austr. Inst. Min. Metall. 275 (1980), 33–42). Synthetic rutile with about 2–3% iron was prepared from Indian ilmenites by the reduction of ilmenite followed by acid leaching (Annie George, V. S. Kelukutty, L. G. Radhika, P. N. Mohan Das and P. K. Rohtagi, J. Mater. Sci., 19 (5), 1984, 1522). Metallic iron from reduced ilmenite was extracted by electrolytic dissolution to give synthetic rutile with high $TiO_2$ content (Allan Benjamin Wilson, Ger. Offen. 255 7411 (1977); Mori Tado Oshi, Kato Akemi and Kawakami Naboru, Jpn. Kokai, 77 128817, (1977)). I. E. Grey, M. J. Hollit, A. Brian, B. O'Brien, Australian Patent 9346047, (1993); Australian Patent 649946 (1994); U.S. Pat. No. 5,427,749, (1995)) disclose a process for the reduction of ilmenite with coal followed by acid leaching before or after aeration rusting. Japanese Patent 58199720 (1983) granted to Ishihara, Sangyo Kaisha discloses a process wherein reduced ilmenite is subjected to aqueous oxidation followed by acid leaching at high temperature. Ilmenite was first reduced and was then subjected to oxidation in an aqueous solution in presence of ozone or hydrogen which was then leached with acids (H. Walter, European Patent 612654, (1994)). Pending Indian Patent Application No. 1262/Del/97 (inventors: P. N. Mohan Das, A. D. Damodaran, K. H. Bhat, S. Velusamy and S. Sasibhushanan) discloses a process for the production of high grade synthetic rutile from Indian ilmenite by employing solid state reduction, oxidation and acid leaching.

Direct chlorination of ilmenite at 850–950° C. in presence of carbon to produce $TiCl_4$ and iron chloride, which are then subsequently separated followed by oxidation of $TiCl_4$ to yield $TiO_2$ is also reported (D. Wendel. D. C. Jr. U.S. Pat. Nos. 4,332,615 (1982); 4,085,189 (1978); J. K. Heymer, G. Stephan and H. Werner, Ger. Offen., U.S. Pat. No. 3,203,482 (1983)).

Reduction smelting of ilmenite in electric arc furnace is another important process commercialised in different countries. This is applicable in countries where electricity is cheap and abundantly available. The slag produced can be used for further processing and pig iron would be a by-product (G. W. Elger, D. E. Kishy, S. C. Rhoads, US Bureau of Mines Investigation Report RI 8140, (1976), 31; D. J. Swinden and D. G. Jones, Trans. Inst. Min. Metall. Sec. C, 87, (1978), 83–87; A. J. Merchant and N. A. Warner, Trans. Inst. Min. Metall. C, 101, (1992), 177–182; R. H. Nafziger, Trans. Inst. Min. Metall. C 87 (1978), 120). A product containing high $TiO_2$ was obtained from the slag by grinding, oxidation, reduction and acid leaching under pressure at high temperatures, (Borowiec Krzysztof, Grau Alfonso E, Gueguin Michel, Turgeon Jean-Franxois, U.S. Pat. No. 5,830,420 (1995)). Simultaneous reduction and melt separation of ilmenite using plasma containing hydrogen, methane or argon are also reported for the production of titania rich slag and pig iron (J. D. Chase and J. F. Skirvan, AIChE Symp. Ser. 75, 186, 38(1978); R. Izhizuka and K. Akashi, J. Jap. Inst. Metals, 45, 1229 (1981); P. K. Mishra, S. K. Singh, D. C. Acharya, D. C. Mohanty and P. K. Sahoo, Min. processing, Recent Advances and Future Trends, Conf. proc. (1995), 875–878, (Eds), S. P. Mehrotra and Shekar Rajeev, Allied Publ. New Delhi; G. M. Denton, A. Schoukens and S. Francois, European Patent 583126 (1994). Warner has reported another method for the production of synthetic rutile (Warner Noel Alfred, Br. Patent 9211052, 92110523, (1992)). A two-stage process involving pelletisation of ilmenite and its pre-reduction followed by submerged arc smelting is reportedly in use in Norway at Tinfos Titan & Iron KS (Metal Bulletin Monthly, September 1996, 67–71). QIT, Canada has developed a process for upgrading their Sorel slag to result in a new proprietary product containing 95% $TIO_2$ and acceptable to chloride-route for pigment manufacturing (Metal Bulletin Monthly, September 1996, 67–71).

Reduction smelting of ilmenite for slag and pig iron is highly energy intensive and as such the process is quite uneconomical in countries where electrical energy is scarce and expensive. The slag thus produced may require further processing for use as a starting material for chlorination. The wet processes used commercially have the disadvantages of generating large quantities of effluents. The reduction smelting processes using electric arc or plasma are more environmentally friendly as they produce less pollution and result in a saleable byproduct in the form of pig iron.

Electric arc smelting of ilmenite is highly energy intensive and requires more time for smelting thus making its throughput very low compared to plasma smelting. Indian Patent Application No. 804/Del/97 of A. D. Damodaran, P. N. Mohan Das, K. H. Bhat, B. C. Mohanty and P. S. Mukherjee, discloses a process involving the smelting of pre-reduced ilmenite in plasma for the production of $TiO_2$ slag and pig iron. The pre-reduced ilmenite in the smelting charge reduces the energy requirement while the plasma renders the process more clean and productive with high throughputs and minimum energy loss. The slag produced by this method had about 80–85% $TiO_2$ content while the pig iron byproduct had a metallisation of 99.76%.

OBJECTS OF THE INVENTION

It is an object of the invention to provide an improved process for the preparation of high grade synthetic rutile from ilmenite.

It is another object of the invention to provide a process for the preparation of high grade synthetic rutile from ilmenite wherein pig iron is obtained as useful by-product.

It is another object of the invention to manufacture improved high grade synthetic rutile for use as a starting material for chlorination.

It is yet another object of the invention to provide a process for the preparation of high grade synthetic rutile from ilmenite by plasma smelting and chemical processing.

It is another object of the invention to provide a process for the preparation of high grade synthetic rutile from ilmenite by a three-step process.

It is yet another object of the invention to provide a process for the preparation of high grade synthetic rutile from ilmenite using low cost extended plasma that is formed by arcing between graphite electrodes.

It is further object of the invention to provide a process for the preparation of high grade synthetic rutile from ilmenite that is continuous.

It is further object of the invention to provide a process for the preparation of high grade synthetic rutile from ilmenite wherein pig iron is also obtained as a useful by-product, which process is eco-friendly.

It is another object of the invention to utilise pre-reduced ilmenite for the preparation of high grade synthetic rutile with pig iron as a useful by-product.

It is a further object of the invention to provide a process for the preparation of high grade synthetic rutile from ilmenite wherein pig iron is also obtained as a useful by-product, which process has high throughputs.

It is further object of the invention to provide a process for the preparation of high grade synthetic rutile that is a better feedstock for further processing, from pre-reduced ilmenite.

SUMMARY OF THE INVENTION

The present invention provides an improved process for the preparation of high grade synthetic rutile from ilmenite with pig iron as a by-product, said process comprising, subjecting ilmenite to reduction with 30–100% (w/w) coal at a temperature in the range of 800–1250° C. for a period of 2–6 hours, cooling and removing unreacted coal to obtain a product of 80–95% metallisation, smelting the metallised ilmenite mixed with less than 10% carbon (w/w) in a transferred arc plasma using arc current in the range of 100–400 amps. arc voltage of 20–60 V under flow of inert gas at a rate in the range of 0–2 liters/minute, separating the metal as pig iron and $TiO_2$ as slag, grinding the slag followed by the oxidation in a temperature range of 600–1000° C. in presence of an oxidising gas for 25–30 minutes, followed by leaching the oxidised product with dilute HCl at temperatures below 90° C. for a period for 1 to 6 hours, followed by filtration, washing and drying, to obtain synthetic rutile.

In one embodiment of the present invention, unreacted coal and ash in the reduced ilmenite are removed by sieving and magnetic separation.

In another embodiment of the present invention, pig iron is obtained as a by-product during the process of the invention during the step of smelting of metallised ilmenite.

In another embodiment of the present invention, the inert gas used during the step of smelting is argon.

In a further embodiment of the present invention, plasma is generated in the transferred mode in order to enhance the thermal efficiency of arc plasma smelting.

In yet another embodiment of the present invention, the dilute acid used in the step of acid leaching of the ground slag is dilute HCl.

The novelty of the process is that for the first time a combination of pre-reduction of ilmenite and its plasma melting is employed to produce titania rich slag and metallic iron.

Essentially the process involves the following 3 steps:

1. Pre-reduction of ilmenite wherein oxides of iron are preferentially reduced to metallic state using non-metallurgical coke and separation of metallised product from non magnetic gangue materials by magnetic separation.
2. Plasma melting of pre-reduced ilmenite using a cold plasma in transferred mode and separation of titania rich slag and metallic iron.
3. Chemical beneficiation of the titania rich slag to synthetic rutile, by oxidation followed by acid leaching.

The advantages of the combination of pre-reduction and plasma melting are manifold. In the pre-reduction stage, only non-metallurgical coke, which is less expensive and freely available is used. The production cost of the above process hence, is considerably less compared to the use of very expensive coke electric arc smelting or plasma smelting of raw ilmenite. In addition, as most of the non magnetic gangue materials associated with the ilmenite are removed during the magnetic separation of the pre-reduced ilmenite, loading into the plasma furnace is considerably reduced as a result of which cleaner slag and metallic iron are separated. Energy requirement in the process is also reduced as it is not being used up for melting the gangue materials in ilmenite. Combination of pre-reduction and plasma melting also results in very high throughputs as melting of the charge takes place very fast and time required for the reduction of small quantities of iron oxide remaining in the charge is minimum.

The above invention differs from the existing state of art with the following facts:

Existing processes for processing of ilmenite essentially involve use of either electric arc or plasma in order to smelt the raw ilmenite. As both reduction of iron oxide to metallic state and melt separation of iron and titania rich slag take place simultaneously, the energy requirement is very high and throughputs are very less. Pre-reduction of ilmenite prior to its melting in the plasma as invented in this process brings down the energy requirement considerably besides increasing the throughput of the process. The separated titania rich slag and metallic iron are also more clean compared to those generated in the case of ilmenite smelting as most of the gangue materials are separated from ilmenite in the pre-reduction stage.

DETAILED DESCRIPTION OF THE INVENTION

The present invention is a three-step process wherein ilmenite is first reduced with coal to a high degree of metallisation in a rotary reactor, melting the reduced ilmenite in a plasma furnace and subsequent beneficiation of titania slag by chemical processing. In the plasma furnace, use of high enthalpy of thermal plasma generated in the extended arc with a plasma forming gas such as argon results in very high throughput, rapid melting and minimum energy loss. Thermal efficiency of arc plasma melting was further enhanced by generating this plasma in the transferred mode. The oxidation of the ground titania slag helps in converting all the remaining iron to ferric state, conversion of lower titanium oxides to the tetravalent state and decomposition of glassy structure of the slag. On leaching with dilute acid the iron oxide alone gets dissolved preferentially leaving behind a high grade synthetic rutile containing upto 96% $TiO_2$. The advantages of this process are that it uses a thermally efficient plasma for smelting the pre-reduced ilmenite. Further, along with production of high grade synthetic rutile, a valuable by-product pig iron is also formed.

The process of the invention generally involves the following three sequential steps:

Commercially available Indian ilmenite is subjected to reduction with 30–100 w % coal in a rotary reactor at about 850–1250° C. for about 2–6 hours. It is then cooled and sieved to remove unreacted coal followed by a magnetic separation to separate coal fines and ash. The product containing about 28% total iron had a metallisation of about 90–95%.

Pre-reduced ilmenite was then mixed with less than 10 w % carbon depending on the extent of pre-reduction and amount of unreduced iron oxide in it.

The above charge was then taken in a graphite crucible either in the form of loose powder or as pellets. The crucible had a side tap hole at its bottom which is plugged by a high melting compound material during melting. Release of tap hole was effected by a graphite rod attached to the plug.

Depending on the power and design of the reactor, an extended arc argon plasma in the transferred mode was struck for a fixed time between 1–5 minutes. The graphite electrode along with the charge formed one of the electrodes. The other graphite electrode above the charge had a provision for introducing plasmogen gas such as argon into the arc zone to form extended/expanded arc plasma in the transferred mode. After a fixed time the crucible was taken out and the melted charge which was in the form of a lump was separated from the crucible. It is believed that the iron gets separated due to melting point difference and settles at the bottom of the lump because of its higher density. The lump was then cleaned and crushed in order to separate the titania rich slag and the pig iron. The slag was found to be enriched in $TiO_2$ content (estimated as above 85%). The raw material for the plasma experiment i.e., pre-reduced ilmenite on chemical analysis was found to contain the following composition:

| | |
|---|---|
| Total iron | 28.32% |
| $TiO_2$ | 62.64% |
| Phosphorous | 0.12% |
| Carbon | 1.00% |
| Sulphur | 0.15% |

The invention will now be described with reference to the following examples which are by way of illustrations only and should not be read or construed as limiting the scope of the invention.

EXPERIMENT NO.1

About 1 w % carbon was mixed with pre-reduced ilmenite and then granulated. 400 g of granulated powder was taken in a graphite crucible. At the centre of the graphite crucible a cylindrical graphite rod (−ve electrode) with a central hole for purging the plasmogen gas was placed and a good contact with the graphite crucible (+ve electrode) was established. Arc was struck with the flow of argon gas through the upper electrode and the electrode was slowly raised. The mixture then melts slowly and the heavier molten iron settles at the bottom of the crucible. The arc is stopped after 90 seconds. On cooling, a lump is formed in the crucible which can be taken out from the powdery charge easily and cleaned. With little impact, the lump breaks and pig iron in the form of a small lump gets separated from the slag. Analysis was done as per standard procedures. The results are as follows:

Experimental Conditions

| | |
|---|---|
| Charge taken | 400 g. |
| Plasma power | 10–12 KW |
| Time | 90 sec. |
| Weight of the lump | 180 g |
| Weight of pig iron lump | 45 g |
| Weight of $TiO_2$ slag | 135 g. |

Chemical Analysis of Pig Iron

| | |
|---|---|
| Total iron | 95% |
| Metallic iron | 90% |
| $TiO_2$ content | 1.0% |

Chemical Analysis of Slag

| | |
|---|---|
| $TiO_2$ content | 86% |
| Total iron | 10.0% |

EXPERIMENT NO.2

A mixture containing pre-reduced ilmenite mixed with 5% (w/w) carbon was granulated. 400 g of granulated powder was taken in the graphite crucible. At the centre of the graphite crucible a cylindrical graphite rod with central hole for purging the plasmogen gas was placed with good contact. An arc was struck with argon flow and the electrode was slowly raised as the charge started melting. The arc was stopped after 90 seconds. The lump formed in the crucible was taken out and separated into slag and metal. The metal and slag after washing were analysed as per standard procedures. The results are as follows:

Experimental Conditions

| | |
|---|---|
| Charge taken | 400 g. |
| Plasma power | 10–12 KW |
| Time | 90 seconds |
| Weight of the lump | 160 g. |
| Weight of pig iron lump | 25 g. |
| Weight of $TiO_2$ slag | 135 g. |

Chemical Analysis

Metallic Fraction

| | |
|---|---|
| Total iron | 86% |
| Metallic iron | 84% |
| $TiO_2$ content | 5% |

Slag Fraction

| | |
|---|---|
| $TiO_2$ content | 78% |
| Total iron | 17% |
| Metallic iron | 15% |

From the series of experiments and based on the results of analysis of slag and metal, the carbon percentage was fixed at 1% (w/w).

The pre-reduced ilmenite is then mixed with 1% (w/w) carbon and then subjected to plasma smelting at various power inputs and durations to find the optimum conditions for the present smelting set-up.

Effect of Power Input

A number of experiments were carried out to find the effect of plasma power input on the smelting of fixed charge and for fixed durations. The results are tabulated as under:

| Experiment No. | Power (KW) | Wt. of lump (iron + slag) g | Wt. of iron separated from lump (g) | Wt. of slag separated from lump (g) | % iron separated |
|---|---|---|---|---|---|
| 1 | 5–6 | 49.0 | 9.50 | 39.50 | 19.0 |
| 2 | 9–10 | 70.0 | 16.00 | 54.00 | 23.0 |
| 3 | 12–13 | 72.0 | 18.00 | 54.00 | 25.0 |
| 4 | 17–18 | 77.0 | 19.75 | 57.50 | 25.0 |
| 5 | 20–21 | 87.0 | 22.00 | 65.00 | 25.0 |

It can be seen from the results that for a fixed time the weight of the lump produced does not increase with power input and no further increase in percentage iron separation takes place even after increasing the power beyond an optimum value. Hence for this set up, the power input is fixed between 10–12 KW as optimum.

Effect of Time

After fixing the power of plasma, a number of experiments were carried out to find out the effect of time of melting on separation of metal and slag.

About 1 w % carbon was mixed with pre-reduced ilmenite and then granulated. About 400 g of the granulated powder was taken in a graphite crucible. A cylindrical graphite rod with a central hole for purging the plasmogen gas formed the −ve electrode while the crucible and the charge formed the +ve electrode. An arc was struck with flow of argon gas and the electrode was slowly raised and the melting was allowed to continue for different time intervals. Afterwards the metal and the slag were separated and analysis was done as per standard procedures. The results are as follows:

| Experiment No. | Time in seconds | Wt. of lump (iron + slag) (g) | Wt. of iron separated from lump (g) | Wt. of slag separated from lump (g) | % Iron separated |
|---|---|---|---|---|---|
| 1 | 15 | 43 | 7.0 | 36.0 | 16.0 |
| 2 | 30 | 68 | 15.5 | 52.5 | 23.0 |
| 3 | 60 | 90 | 21.5 | 68.5 | 24.0 |
| 4 | 90 | 170 | 40.0 | 130.0 | 24.0 |
| 5 | 120 | 175 | 37.0 | 138.0 | 21.0 |

Though the weight of the lump increases proportionately with time upto 120 seconds, separation of iron is found to be maximum at 90 seconds and decrease thereafter. Thus a melting time of 90 seconds is found to be optimum for the separation.

The cold plasma technique which is employed above for the melt separation of iron and titania rich slag from pre-reduced ilmenite has not been attempted in any of the previous processes. This new technique has been made used in the above invention by which the melted material is removed at regular fixed intervals depending on the power and design of the smelting reactor.

From the above results it can be concluded that the optimum power and time for the present plasma set-up is 10–15 KW and 1–2 minutes respectively. With the above conditions, about 2 Kg of the product (slag+iron) was produced in which the weight of the pig iron in the form of lump was 500 g. The chemical analysis of the slag and iron are given below:

Chemical Analysis of Pig Iron

| Total iron | 95% |
|---|---|
| $TiO_2$ content | 1.0% |

Chemical Analysis of Slag

| $TiO_2$ content | 85% |
|---|---|
| Total iron | 12% |

EXPERIMENT NO.3

The slag obtained in this experiment was ground and the powder having less than 0.71 mm size was oxidised at 800° C. for 30 minutes in the presence of air in a furnace. 25 g of the oxidised product was subsequently leached with 6 M HCl. Leaching was carried out at 90° C. with a solid-liquid ratio of 1:4 (w/v). The solution was stirred using a mechanical stirrer. Samples were withdrawn at regular intervals, washed, dried and analysed. The results of the analysis are given below:

| Leaching time (min.) | Total iron in the leach residue (%) | Percentage iron removed | $TiO_2$ in the leach residue (%) |
|---|---|---|---|
| 00 | 8.94 | 00 | 90.0 |
| 60 | 3.07 | 65.66 | 95.2 |
| 120 | 2.93 | 67.23 | 95.5 |
| 180 | 2.80 | 68.68 | 96.0 |
| 240 | 2.73 | 69.46 | 96.1 |
| 300 | 2.73 | 69.46 | 96.1 |
| 360 | 2.73 | 69.46 | 96.1 |

Leaching was found to be complete within 3 hours.

EXPERIMENT NO.4

About 25 g each of slag particles having size less than 0.71 mm was oxidised at different temperatures such as 500, 600, 700, 800 and 1000° C. for 30 minutes in the presence of air in a furnace. 10 g of these samples were then leached with 6 M HCl at 90° C. for 3 hours at a solid-liquid ratio of 1:10 (w/v). Leach residue samples were washed, dried and analysed. The results of the analysis are given below:

| Oxidation Temperature (° C.) | Total iron content in leach residue | % Iron removed | $TiO_2$ content in the leach residue |
|---|---|---|---|
| 500 | 3.69 | 62.42 | 95.93 |
| 600 | 3.54 | 60.40 | 95.82 |
| 700 | 3.16 | 62.23 | 96.56 |
| 750 | 2.88 | 65.22 | 96.50 |
| 800 | 2.51 | 71.89 | 96.62 |
| 1000 | 5.00 | 39.98 | 93.81 |

These results clearly indicate that oxidation of the slag at 800° C. for 30 minutes followed by dilute HCl leaching at 90° C. for 3 hours produces a brown product with high $TiO_2$ content of about 96%. Reoxidation temperature of 800° C. was found to be optimum for maximum removal of iron during leaching.

EXPERIMENT NO.5

About 50 g of titania slag powdered to a size less than 0.71 mm was oxidised at 800° C. for 30 minutes in the presence of oxygen containing gas in a furnace. 10 g each of the above oxidised product was subsequently leached at 50, 60, 70, 80 and 85° C. with 6 M HCl for 3 hours duration with a solid-liquid ratio of 1:10 (w/v). Leach residue samples were washed, dried and analysed for iron and $TiO_2$ content. The results of the analysis are given below:

| Leaching temperature (° C.) | Total iron in leach residue (%) | % Iron removed | $TiO_2$ content in leach residue |
|---|---|---|---|
| 50 | 3.18 | 64.39 | 95.70 |
| 60 | 2.59 | 70.99 | 96.00 |
| 70 | 2.50 | 72.00 | 96.30 |
| 80 | 2.50 | 72.00 | 96.26 |
| 85 | 2.51 | 71.89 | 96.26 |

Above results clearly indicate that leaching temperature of 60° C. is sufficient and optimum for the maximum removal of iron from the oxidised slag. Leaching at temperatures beyond 60° C. did not result in any further increased removal of iron.

ADVANTAGES OF THE INVENTION

1. The process makes use of low cost extended plasma formed by arcing between graphite electrodes and the charge resulting in low cost of production particularly as there is saving in power due to this innovative cold plasma technique. Employment of plasmogen gas such as argon during the generation of plasma enables intensive, rapid and localised heating and melting of a volume of charge without affecting surrounding charge and lining materials and crucibles. The flow of an inert gas through the plasma enables a rapid propagation of heat into larger volume of the charge without any enthaply loss. The volume of the charge being heated and melted in turn depends on the power input and the flow rate of argon gas. Intense and localised heating of the charge due to plasma in presence of flow of argon gas considerably reduces the energy requirement of the process compared to electric arc smelting or plasma melting without plasmogen gas.

2. The method of invention is a simple and eco-friendly method and results in the separation of more than 90% of the iron in pre-reduced ilmenite.

3. A valuable by-product, viz. pig iron is obtained that has a high value and is in great demand.

4. The main product obtained, synthetic rutile is a better feedstock for further processing to obtain $TiO_2$ is high grade synthetic rutile which would be a better feed stock for further processing.

5. The process has high throughputs due to the use of high enthalpy argon thermal plasma.

6. The process can be used for continuous production with the removal of the lump formed at regular fixed intervals.

We claim:

1. An improved process for the preparation of high grade synthetic rutile from ilmenite with pig iron as a by-product, said process comprising, subjecting ilmenite to reduction with 30–100% coal (w/w) at a temperature in the range of 850–1250° C. for a period of 2–6 hours thereby producing ash, cooling and removing unreacted coal to obtain a product having 80–95% metallisation; smelting the metallised ilmenite mixed with less than 10% carbon (w/w) in a transferred arc plasma using arc current in the range of 100–400 amps., arc voltage of 20–60 V under flow of inert gas at a range of 0–2 liters/minute for a fixed time in the range 1–5 minutes; separating the metal as pig iron and $TiO_2$ as slag; grinding the slag followed by oxidation in a temperature range of 500–1000° C. in the presence of an oxidizing gas for 25–30 minutes, followed by leaching the oxidised product with dilute HCl at temperatures below 90° C. for a period of 1–6 hours followed by filtration, washing and drying to obtain synthetic rutile.

2. A method as claimed in claim 1 wherein unreacted coal and ash in the reduced ilmenite are removed by sieving and magnetic separation.

3. A method as claimed in claim 1 wherein the pig iron is obtained as a by-product during the process of the invention during the step of smelting of metallized ilmenite.

4. A method as claimed in claim 1 wherein the inert gas used during the step of smelting is argon.

5. A method as claimed in claim 1 wherein the plasma is generated in a transferred mode.

6. A process as claimed in claim 1 wherein the oxidation temperature is about 800° C.

7. A process as claimed in claim 1 wherein the dilute HCl is used is a 6 M HCl.

* * * * *